(12) United States Patent
Teichmann et al.

(10) Patent No.: US 10,651,648 B2
(45) Date of Patent: May 12, 2020

(54) SYSTEM FOR POWERING AUXILIARY LOADS OF AN ENERGY STORAGE SYSTEM

(71) Applicant: GENERAL ELECTRIC COMPANY, Schenectady, NY (US)

(72) Inventors: Ralph Teichmann, Niskayuna, NY (US); Honggang Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 275 days.

(21) Appl. No.: 15/869,029

(22) Filed: Jan. 11, 2018

(65) Prior Publication Data

US 2019/0214817 A1 Jul. 11, 2019

(51) Int. Cl.
*H02J 1/10* (2006.01)
*H02J 9/06* (2006.01)

(52) U.S. Cl.
CPC .............. *H02J 1/10* (2013.01); *H02J 9/066* (2013.01)

(58) Field of Classification Search
None
See application file for complete search history.

(56) References Cited

U.S. PATENT DOCUMENTS

| | | |
|---|---|---|
| 6,559,559 B2 | 5/2003 | Cratty |
| 6,787,933 B2 | 9/2004 | Claude et al. |
| 8,373,312 B2 | 2/2013 | O'Brien et al. |
| 9,061,595 B2 | 6/2015 | King et al. |
| 9,148,085 B2 | 9/2015 | King et al. |
| 9,293,923 B2 | 3/2016 | Kim |
| 9,513,614 B2 | 12/2016 | Schnetzka et al. |
| 2005/0018459 A1 | 1/2005 | Miettinen |
| 2011/0021564 A1 | 1/2011 | Sanfilippo |
| 2011/0133555 A1 | 6/2011 | Choi |

(Continued)

FOREIGN PATENT DOCUMENTS

| | | |
|---|---|---|
| CN | 204586527 U | 8/2015 |
| WO | 2016001403 A1 | 1/2016 |

OTHER PUBLICATIONS

International Search Report and Written Opinion dated Mar. 26, 2019 which was issued in connection with PCT PCT/US2018/064651 which was filed on Dec. 10, 2018.

(Continued)

*Primary Examiner* — Jared Fureman
*Assistant Examiner* — Aqeel H Bukhari
(74) *Attorney, Agent, or Firm* — Buckley, Maschoff & Talwalkar LLC

(57) ABSTRACT

An energy storage system is presented. The energy storage system includes a primary energy storage device operatively couplable to a main bus, where the main bus is operatively coupled to a power generation device. Further, the energy storage system includes an auxiliary bus operatively couplable to the main bus and a grid bus. Furthermore, the energy storage system includes a plurality of auxiliary loads operatively coupled to the auxiliary bus and a housing configured to encompass the primary energy storage device, the auxiliary bus, and the plurality of auxiliary loads, where the auxiliary bus is configured to supply power to the plurality of auxiliary loads from the primary energy storage device, the power generation device, a grid, or combinations thereof.

16 Claims, 3 Drawing Sheets

(56) References Cited

U.S. PATENT DOCUMENTS

| | | | |
|---|---|---|---|
| 2015/0008833 A1* | 1/2015 | Ray | H05B 37/0209 |
| | | | 315/161 |
| 2015/0108755 A1* | 4/2015 | Das | H02J 9/061 |
| | | | 290/43 |
| 2017/0126010 A1 | 5/2017 | Canales et al. | |
| 2017/0166075 A1 | 6/2017 | Hong et al. | |

OTHER PUBLICATIONS

Mohammed Kh. Al-Nussairi et al., "Constant Power Loads(CPL) with Microgrids: Problem Definition, Stability Analysis and Compensation Techniques", Energies 2017, vol. 10, Issue 10, Oct. 19, 2017, pp. 1-20 See p. 3; and figure 1.

Saravanapriyan et al., "Adaptive Neural Network Based Energy Management System for Grid Integrated Hybrid System", International Journal of Research and Engineering, vol. 2, Issue: 4, 5 Pages, Apr. 2015.

Kamal et al., "Energy management and control of grid-connected wind/fuel cell/battery Hybrid Renewable Energy System", 2016 International Conference on Intelligent Systems Engineering (ICISE), pp. 161-166, 2016.

* cited by examiner

SYSTEM FOR POWERING AUXILIARY LOADS OF AN ENERGY STORAGE SYSTEM

BACKGROUND

Embodiments of the present specification generally relate to a power generation system having an energy storage system, and more particularly to an energy storage system having an auxiliary direct current (DC) bus to provide power to auxiliary loads using multiple energy sources.

As will be appreciated, an energy storage system is an electrical power storage and distribution system. Typically, the energy storage system includes power buses, energy storage devices, power electronic circuits, and auxiliary loads. The power electronic circuits include inverters and converters.

Typically, the power generation system and in particular, the energy storage system includes a main bus. The auxiliary loads are coupled to the main bus. Traditionally, a single energy source is used to supply power to the auxiliary loads via the main bus. Any fault in the energy source results in a disruption in supply of power to the auxiliary loads, thereby compromising the reliability of the power generation system. Also, use of a single DC bus to provide power to the auxiliary loads may result in a complex architecture of the power generation system.

In recent times, in addition to the main bus, the power generation system includes additional buses to supply power to the auxiliary loads. Even though the additional buses are employed, faults in the energy source that supplies power to the auxiliary loads tend to lower the reliability of the associated power generation system.

BRIEF DESCRIPTION

In accordance with aspects of the present specification, an energy storage system is presented. The energy storage system includes a primary energy storage device operatively couplable to a main bus, where the main bus is operatively coupled to a power generation device. Further, the energy storage system includes an auxiliary bus operatively couplable to the main bus and a grid bus. Furthermore, the energy storage system includes a plurality of auxiliary loads operatively coupled to the auxiliary bus and a housing configured to encompass the primary energy storage device, the auxiliary bus, and the plurality of auxiliary loads, where the auxiliary bus is configured to supply power to the plurality of auxiliary loads from the primary energy storage device, the power generation device, a grid, or combinations thereof.

In accordance with another aspect of the present specification, a power generation system is presented. The power generation system includes a power generation device, a bidirectional converter, a main bus configured to couple the power generation device to the bidirectional converter, a primary energy storage device operatively coupled to the main bus, an auxiliary bus operatively coupled to the main bus and a grid bus, and a plurality of auxiliary loads configured to provide thermal support to the primary energy storage device and operatively coupled to the auxiliary bus, where the auxiliary bus is configured to supply power to the plurality of auxiliary loads from the primary energy storage device, the power generation device, a grid, or combinations thereof.

In accordance with yet another aspect of the present specification, a method of providing power to a plurality of auxiliary loads of an energy storage system from a power generation device, a primary energy storage device, a grid, or combinations thereof is presented. The method includes providing a first power to at least one of a rectifier and a first converter from at least one of the power generation device, the primary energy storage device, and the grid. Further, the method includes converting, using at least one of the first converter and the rectifier, the first power to a second power. Furthermore, the method includes providing the second power to an auxiliary bus. Moreover, the method includes converting, using one or more auxiliary power conversion units, the second power on the auxiliary bus for use by the plurality of auxiliary loads of the energy storage system.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

As will be described in detail hereinafter, various embodiments of a power generation system and a method of supplying power using a power generation system are presented. The exemplary power generation system may be employed in distributed power generation applications, micro-power generation, small-scale energy generation, and/or larger-scale applications, such as power plants or power stations. The power generation system is operatively coupled to the grid and includes at least one power generation device and an energy storage system. The energy storage system includes energy storage devices, a dedicated auxiliary bus, and auxiliary loads coupled to the auxiliary bus. Use of the dedicated auxiliary bus for powering the auxiliary loads enables a simpler circuit architecture. The energy storage devices in the energy storage system are configured to provide power to the auxiliary loads via the dedicated auxiliary bus. In addition to the energy storage devices, the power generation device and the grid are also configured to provide power to the auxiliary loads. The use of multiple power sources, such as the grid, the energy storage devices, and the power generation device, aids in ensuring an uninterrupted supply of power to the auxiliary loads. The uninterrupted supply of power to the auxiliary loads in turn aids in maintaining desired operating conditions, such as a desired temperature in the energy storage system.

Figure 1:
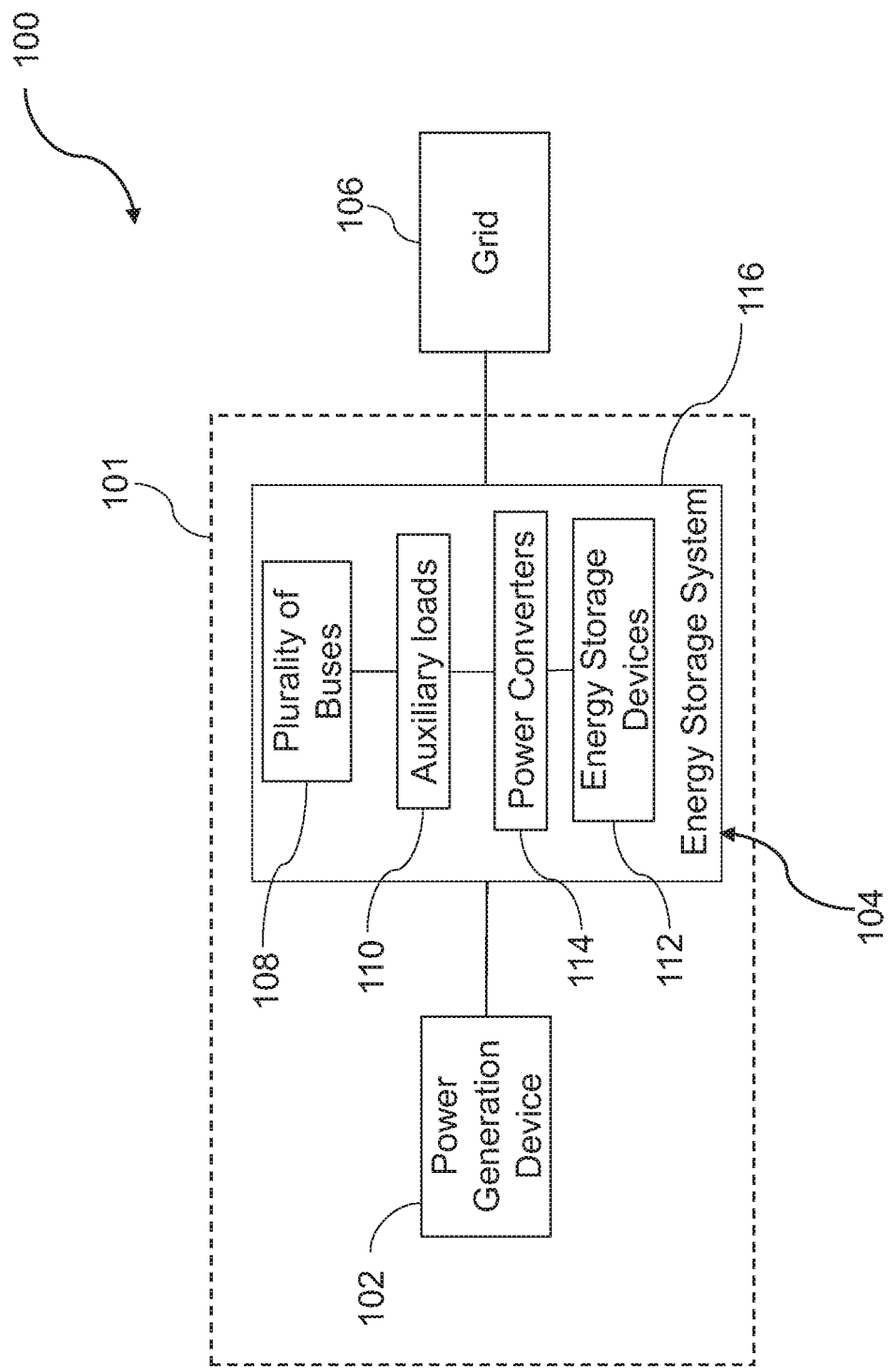
FIG. 1 is a diagrammatical representation of a power generation system, according to aspects of the present specification.

Turning now to the drawings, FIG. 1 is a diagrammatical representation 100 of system for generating power, according to aspects of the present specification. In particular, the system 100 includes a power generation system 101 and a grid 106. Further, the power generation system 101 includes a power generation device 102 and an energy storage system 104. In a presently contemplated configuration, the power generation system 101 is coupled to the grid 106. Moreover, the energy storage system 104 is disposed between the power generation device 102 and the grid 106. Further, the energy storage system 104 is operatively coupled to the power generation device 102 and the grid 106.

The power generation device 102 is configured to generate power, such as an alternating current (AC) power or a direct current (DC) power. The power generation device 102 may include a solar based power generation device, a wind based power generation device, a fuel cell based power generation device, or the like. Moreover, the grid 106 is configured to receive power from the power generation device 102 via the energy storage system 104. Further, the energy storage system 104 may also be configured to draw power from the grid 106 or the power generation device 102.

The system of FIG. 1 further includes a plurality of buses 108. In one example, the plurality of buses 108 includes a main bus, a grid bus, and an auxiliary bus. Furthermore, in one example, the auxiliary bus is an auxiliary DC bus.

Further, the energy storage system 104 also includes auxiliary loads 110, energy storage devices 112, power converters 114, and a housing 116. In particular, the housing 116 is configured to encompass at least one of the buses 108, the auxiliary loads 110, the energy storage devices 112, and the power converters 114. In one embodiment, the housing 116 is configured to encompass at least a portion of the main bus and the grid bus. The power converters 114 may include DC to DC converters, AC to DC converters, AC to AC converters, inverters, rectifiers, or the like. The auxiliary loads 110 may include a control and instrumentation device, a ventilation blower, a cooling blower, associated motors, a battery thermal management device, a battery electrical control device, or the like. In one embodiment, the auxiliary loads 110 are configured to provide thermal support to the energy storage devices 112. In particular, the auxiliary loads 110 are configured to maintain desired operating conditions in the energy storage system 104, such as a desired temperature. Maintaining the desired temperature aids in supporting function of the energy storage devices 112.

The auxiliary loads 110 and the energy storage devices 112 may be coupled to corresponding buses 108 via corresponding power converters 114. In one example, the energy storage devices 112 may be coupled to the main bus and the auxiliary bus via the corresponding power converters 114. The energy storage devices 112 may include a primary energy storage device and optionally a back-up energy storage device. In one embodiment, the energy storage devices 112 may include batteries and/or ultracapacitors. In an embodiment, the primary energy storage device includes a plurality of lithium ion batteries and the back-up energy storage device includes one or more ultracapacitors.

In accordance with some aspects of the present specification, all the auxiliary loads 110 are coupled to the auxiliary bus. Coupling all the auxiliary loads 110 to a dedicated auxiliary bus provides a simpler circuit architecture.

In accordance with one embodiment of the present application, the power generation device 102, the grid 106, the energy storage devices 112, or combinations thereof are configured to provide an uninterrupted supply of power to the auxiliary loads 110 via the buses 108 and corresponding power converters 114. In one example, if the power generation device 102 and the grid 106 fail to provide power to the auxiliary loads 110, the auxiliary loads 110 may be powered using the energy storage devices 112. It may be noted that in the energy storage system 104, the coupling of the buses 108, the energy storage devices 112, the power converters 114, and the auxiliary loads 110 aids in facilitating the uninterrupted supply of power to the auxiliary loads 110. The uninterrupted supply of power to the auxiliary loads 110 in turn aids in maintaining desired operating conditions in the energy storage system 104, thereby improving reliability of the power generation system 101.

Figure 2:
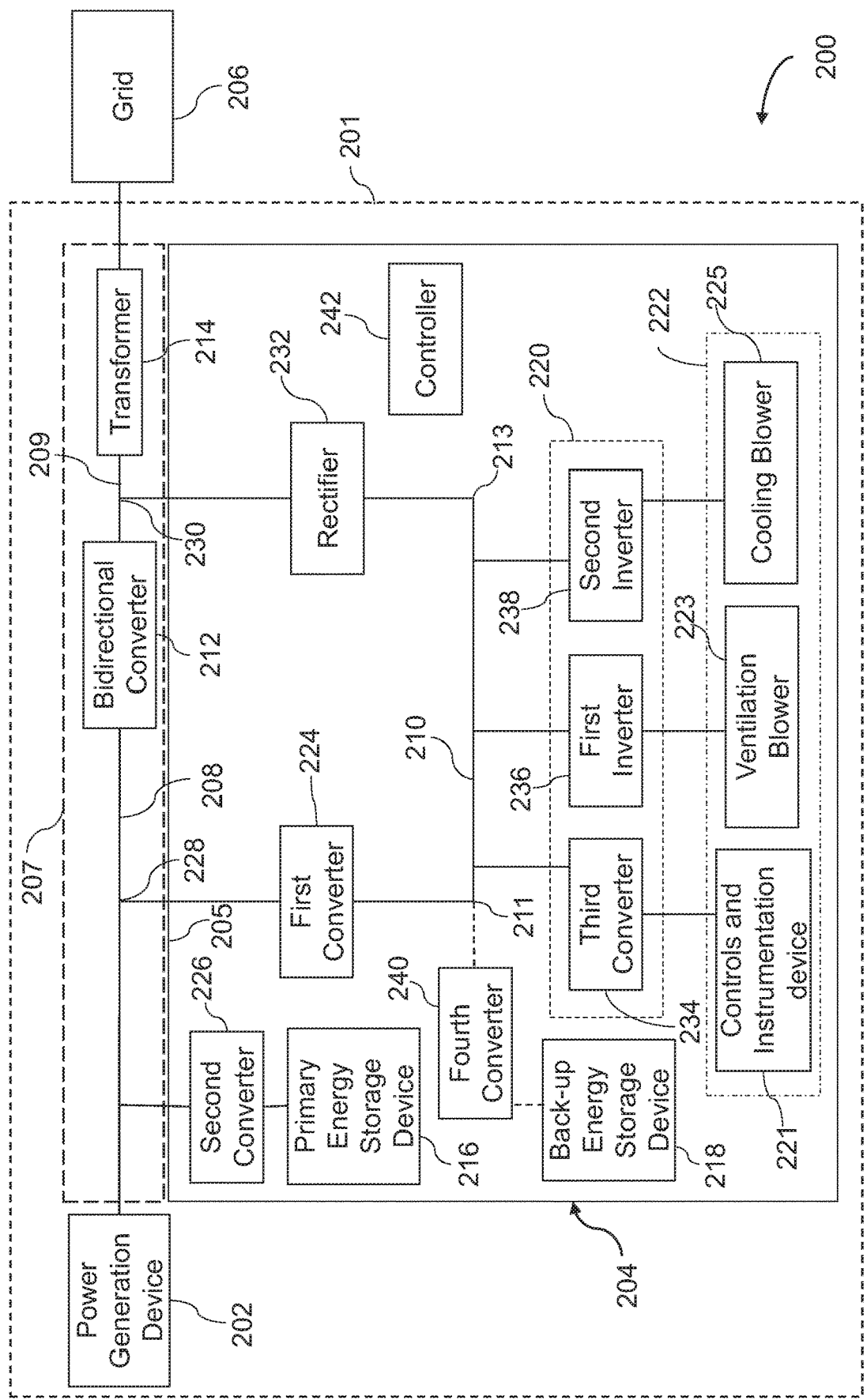
FIG. 2 is a diagrammatical representation of one embodiment of the power generation system of FIG. 1, according to aspects of the present specification.

Referring now to FIG. 2, a diagrammatical representation 200 of one embodiment of the system 100 of FIG. 1, according to aspects of the present specification is presented. In particular, the system of FIG. 2 includes a power generation system 201 and a grid 206. Also, the power generating system 201 includes a power generation device 202 and an energy storage system 204. The power generation system 201 is operatively coupled to the grid 206. In particular, the power generation device 202 is operatively coupled to the grid 206 via a main bus 208 and a grid bus 209.

The energy storage system 204 includes an auxiliary bus 210, a primary energy storage device 216, an optional back-up energy storage device 218, one or more auxiliary power conversion units 220, auxiliary loads 222, a first converter 224, and a second converter 226 enclosed in a housing 205. In some embodiments, represented by the extended housing lines 207, the energy storage system 204 further includes a portion of the main bus 208 and the grid bus 209 as well as a bidirectional converter 212 and/or power conditioning equipment such as a transformer 214. In either embodiment, in the example of FIG. 2, the main bus 208 is configured to couple the power generation device 202 to the bidirectional converter 212. Further, the grid bus 209 is configured to couple the bidirectional converter 212 to the grid 206. In particular, the bidirectional converter 212 is coupled to the grid 206 using the grid bus 209 via the transformer 214. Also, in one example, the bidirectional converter 212 is a DC to AC converter or an inverter. In one example, the main bus 208 is a DC bus and the grid bus 209 is an AC bus. Further, the primary energy storage device 216 is operatively couplable to the main bus 208.

Further, the main bus 208 includes a first node 228 and the grid bus 209 includes a second node 230. The first node 228 is positioned between an input terminal of the bidirectional converter 212 and the power generation device 202. Also, the second node 230 is positioned between an output terminal of the bidirectional converter 212 and the transformer 214. The bidirectional converter 212 is coupled between the first node 228 and the second node 230. Further, the transformer 214 is coupled between the second node 230 and the grid 206. In one embodiment, the first node 228 is on the DC bus and the second node 230 is on the AC bus.

Moreover, the auxiliary bus 210 includes an auxiliary DC bus. In one example, a voltage of the main bus 208 is higher than a voltage of the auxiliary bus 210. The auxiliary bus 210 is operatively couplable to the main bus 208 and the grid bus 209. In one embodiment, the auxiliary bus 210 is coupled to the main bus 208 and the grid bus 209. Particularly, one end 211 of the auxiliary bus 210 is coupled to the first node 228 of the main bus 208 and another end 213 of the auxiliary bus 210 is coupled to the second node 230 of the grid bus 209. More specifically, the one end 211 of the auxiliary bus 210 is coupled to the first node 228 via the first converter 224. The first converter 224 is a DC to DC converter. Further, in the embodiment shown in FIG. 2, the another end 213 of the auxiliary bus 210 is coupled to the second node 230 via the rectifier 232. The rectifier 232 is an AC to DC converter. The rectifier 232 is configured to convey power only in one direction, that is, from the grid 206 to the auxiliary bus 210. This aids in preventing any backflow of current from the auxiliary bus 210 to the grid 206, thereby avoiding undesirable power loss for the auxiliary loads 222 coupled to the auxiliary bus 210 in event of disconnection from the grid 206 or a fault on the grid bus 209.

Additionally, in one embodiment, the primary energy storage device 216 is coupled to the main bus 208 via the second converter 226. In certain embodiments, the primary energy storage device 216 is coupled to the main bus 208 between the power generation device 202 and the first node 228. In one embodiment, the primary energy storage device 216 includes a plurality of batteries. In a particular embodiment, the primary energy storage device 216 includes a plurality of lithium ion batteries.

In accordance with aspects of the present specification, excess power generated by the power generation device 202 is provided to the primary energy storage device 216, thereby charging the primary energy storage device 216. The charged primary energy storage device 216 may be employed to deliver power to the auxiliary loads 222 in the absence of supply of power from the power generation device 202 or the grid 206.

In one embodiment, the auxiliary loads 222 include a battery thermal management device, a battery electrical control device, a control and instrumentation device 221, a ventilation blower 223, a cooling blower 225, associated motors, and the like. For the ease of representation, only a few auxiliary loads are depicted in the example of FIG. 2.

The auxiliary loads 222 may be coupled to the auxiliary bus 210 via one or more auxiliary power conversion units 220. In the example depicted in FIG. 2, the auxiliary power conversion units 220 include a third converter 234, a first inverter 236, and a second inverter 238. The control and instrumentation device 221 is coupled to the auxiliary bus 210 via the third converter 234. The third converter 234 is a DC to DC converter. Moreover, the ventilation blower 223 is coupled to the auxiliary bus 210 via the first inverter 236 and the cooling blower 225 is coupled to the auxiliary bus 210 via the second inverter 238. In this example, the inverters 236 and 238 include DC to AC converters.

Additionally, in certain embodiments, the back-up energy storage device 218 is coupled to the auxiliary bus 210 via a fourth converter 240. In this embodiment, the fourth converter 240 (also referred to as an additional converter) may be coupled directly between the back-up energy storage device 218 and the auxiliary bus 210. In one embodiment, the back-up energy storage device 218 includes one or more ultracapacitors. The fourth converter 240 is a DC to DC converter. In certain situations, if power to the auxiliary loads 222 is not sufficiently available from the grid 206, the power generation device 202 or the primary energy storage device 216, power to the auxiliary loads 222 may be provided from the back-up energy storage device 218 via the auxiliary bus 210. Powering of the auxiliary loads 222 using the back-up energy storage device 218 in the absence of power supply from the other sources may also be used for a black start of the auxiliary loads 222.

Furthermore, the system 200 includes a controller 242. Although the example of FIG. 2 represents that the controller 242 is a part of the energy storage system 204, in other embodiments, the controller 242 may be disposed exterior to the energy storage system 204. In one embodiment, the controller 242 is configured to control operation of the first converter 224, the second converter 226, the third converter 234, the first inverter 236 and the second inverter 238. In one embodiment, the controller 242 is configured to allow voltage of at least one of the main bus 208 and the auxiliary bus 210 to fluctuate within a range of voltage values. In one embodiment, the controller 242 is configured to control operation of the first converter 224 and the rectifier 232 in a manner such that the voltage of the auxiliary bus 210 fluctuates within the range of voltage values. In one example, the range of voltage values of the auxiliary bus 210 may be in a range from about 345 volts to about 420 volts. Since, the voltage of the auxiliary bus 210 is allowed to fluctuate within the range of voltage values, the voltage requirements of the different auxiliary loads 222 coupled to the auxiliary bus 210 are met. As used herein, the term "controller" refers to integrated circuits (ICs), a computer, a microcontroller, a microcomputer, a programmable logic controller (PLC), an application specific integrated circuit (ASIC), application-specific processors, digital signal processors (DSPs), field programmable gate arrays (FPGAs), and/or any other programmable circuits.

During operation of the power generation system 201, it is desirable to power the auxiliary loads 222 for maintaining the desired operating condition of the energy storage system 204, such as a desired temperature in the energy storage system 204. In accordance with aspects of the present specification, one or more of the power generation device 202, the primary energy storage device 216, the grid 206, and the optional back-up energy storage device 218 are configured to supply power to the auxiliary loads 222. In particular, use of one or more sources of power to power the auxiliary loads 222 aids in ensuring an uninterrupted supply of power to the auxiliary loads 222. As will be appreciated, occurrence of a fault in any of the sources of power may result in an interruption of power to the auxiliary loads 222. Use of the power generation system 201 of FIG. 2 aids in continuing the supply of power to the auxiliary loads 222 via use of the other sources of power. The continued, uninterrupted supply of power to the auxiliary loads 222 aids in maintaining the desired operating condition in the energy storage system 204.

The power generation device 202 is configured to generate and supply power to the grid 206. In one example, the power generation device 202 is a solar based power generation device. The solar based power generation device generates a DC power. The DC power generated by the solar based power generation device is conveyed to the grid 206 via the bidirectional converter 212 and the transformer 214. The bidirectional converter 212 aids in converting the DC power generated by the solar based power generation device to a corresponding AC power. Further, the AC power at the output of the bidirectional converter 212 is stepped up using the transformer 214 and provided to the grid 206.

It may be noted that a power generation system operator commits to providing a determined value of power from the power generation device 202 to the grid 206 for a specified time interval. Any power generated by the power generation device 202 that exceeds the determined value of power is representative of excess power generated by the power generation device 202. In one example, the excess power may be a difference between the power generated by the power generation device 202 and the determined value of power. If the power generated by the power generation device 202 is 'X' kW and the determined value of power is 'Y' kW, then the excess power generated by the power generation device 202 is 'X-Y' kW.

In one example, the power generation device 202 is configured to supply excess power to the auxiliary loads 222, the primary energy storage device 216, or both via the main bus 208. In accordance with aspects of the present specification, the excess power generated by the power generation device 202 is provided to the primary energy storage device 216 via the second converter 226. The second converter 226 is a bidirectional converter. The primary energy storage device 216 is configured to store the power provided by the power generation device 202. Accordingly, the primary energy storage device 216 is charged. The excess power generated by the power generation device 202 may alternatively or additionally be provided to the auxiliary loads 222 via the first node 228, the first converter 224, the auxiliary bus 210, and corresponding auxiliary power conversion units 220.

In a scenario where the power generation device 202 is not generating any excess power, the charged primary energy storage device 216 may be configured to provide power to the auxiliary loads 222. Particularly, the primary energy storage device 216 conveys the power to the main bus 208 via the second converter 226. Subsequently, the main bus 208 is configured to convey the power to the auxiliary loads 222 via the first converter 224, the auxiliary bus 210, and the corresponding auxiliary power conversion units 220. In another example where there is some excess power from the power generation device 202 but not enough to fully meet the power requirements of the auxiliary loads 222, the power provided to the auxiliary loads 222 by the primary energy storage device 216 may be in addition to the power provided to the auxiliary loads 222 by the power generation device 202.

In another scenario, when the power generation device 202 is not generating any excess power and the primary energy storage device 216 is in a discharged state, the auxiliary loads 222 may be powered using the grid 206. In this scenario, an AC power may be provided by the grid 206 to the power generation system 201. Further, the AC power is stepped down by the transformer 214. The stepped down AC power is provided to the rectifier 232 via the second node 230 of the grid bus 209. The rectifier 232 converts the stepped down AC power supplied by the transformer 214 to a corresponding DC power. Further, the DC power is conveyed to the corresponding auxiliary power conversion units 220 via the auxiliary bus 210. The auxiliary power conversion units 220 convert the associated DC powers into corresponding AC/DC powers and provide the corresponding AC/DC powers to respective auxiliary loads 222. Use of the rectifier 232 aids in preventing the backflow of power from the auxiliary bus 210 to the grid 206, thereby avoiding undesirable power loss for the auxiliary loads 222 that are coupled to the auxiliary bus 210 even in event of disconnection of the grid 206 or a fault on the main bus 208. Further, when the power generation device 202 is not generating any excess power and the primary energy storage device 216 is in a discharged state, the primary energy storage device 216 may be charged by the power provided by the grid 206.

It may be noted that the power provided to the first converter 224 and/or the rectifier 232 by the power generation device 202, the grid 206, and/or the primary energy storage device 216 may be referred to as a first power. The power converted by the first converter 224 and/or the rectifier 232 and conveyed to the auxiliary bus 210 may be referred to as a second power. The second power is generated based on the first power provided to the first converter 224 and/or the rectifier 232. In one example, value of the second power is dependent on the first power. In another example, the second power is a portion of the first power.

In accordance with another aspect of the present specification, the back-up energy storage device 218 is configured to provide power to the auxiliary loads 222 via the fourth converter 240, the auxiliary bus 210, and the auxiliary power conversion units 220. In one embodiment, the back-up energy storage device 218 is configured to provide power to the auxiliary loads 222 when the power generation device 202, the grid 206, and/or the primary energy storage device 216 are not providing sufficient power to the auxiliary loads 222. The power supplied by the back-up energy storage device 218 may be referred to as a third power. The third power may be a DC power. The value of third power is independent of the values of the first and second powers. Once the back-up energy storage device 218 is discharged, in one embodiment, the back-up energy storage device 218 may be charged by the power provided from the power generation device 202 and/or the grid 206 via the auxiliary bus 210.

It may be noted that each of the auxiliary loads 222 have different power requirements. In one example, at least one auxiliary load may be powered using a DC power, while other auxiliary loads may be powered using an AC power. Accordingly, it is desirable to convert the DC power at the auxiliary bus 210 to a different value of a DC power or an AC power using the corresponding auxiliary power conversion units 220 based on the power requirements of the corresponding auxiliary load 222. The third converter 234 is configured to convert one value of DC power at the auxiliary bus 210 to other value of DC power. In one example, the third converter 234 may be configured to convert a high value of DC power to a lower value of DC power. Further, the lower value of DC power is provided to power the control and instrumentation device 221. In another embodiment, the first and second inverters 236, 238 are configured to convert the DC power at the auxiliary bus 210 to corresponding AC powers. In the example of FIG. 2, the corresponding AC powers are provided to power the ventilation blower 223 and the cooling blower 225, respectively.

In accordance with aspects of the present specification, at any instant in time, during the operation of the energy storage system 204, the power generation device 202, the grid 206, the primary energy storage device 216, the back-up energy storage device 218, or combinations thereof facilitate an uninterrupted supply of power to the auxiliary loads 222. Providing the uninterrupted supply of power to the auxiliary loads 222 aids in maintaining desired operating conditions, such as a desired temperature in the energy storage system 204. Further, the uninterrupted supply of power aids in enhancing reliability of the power generation system 201.

Figure 3:
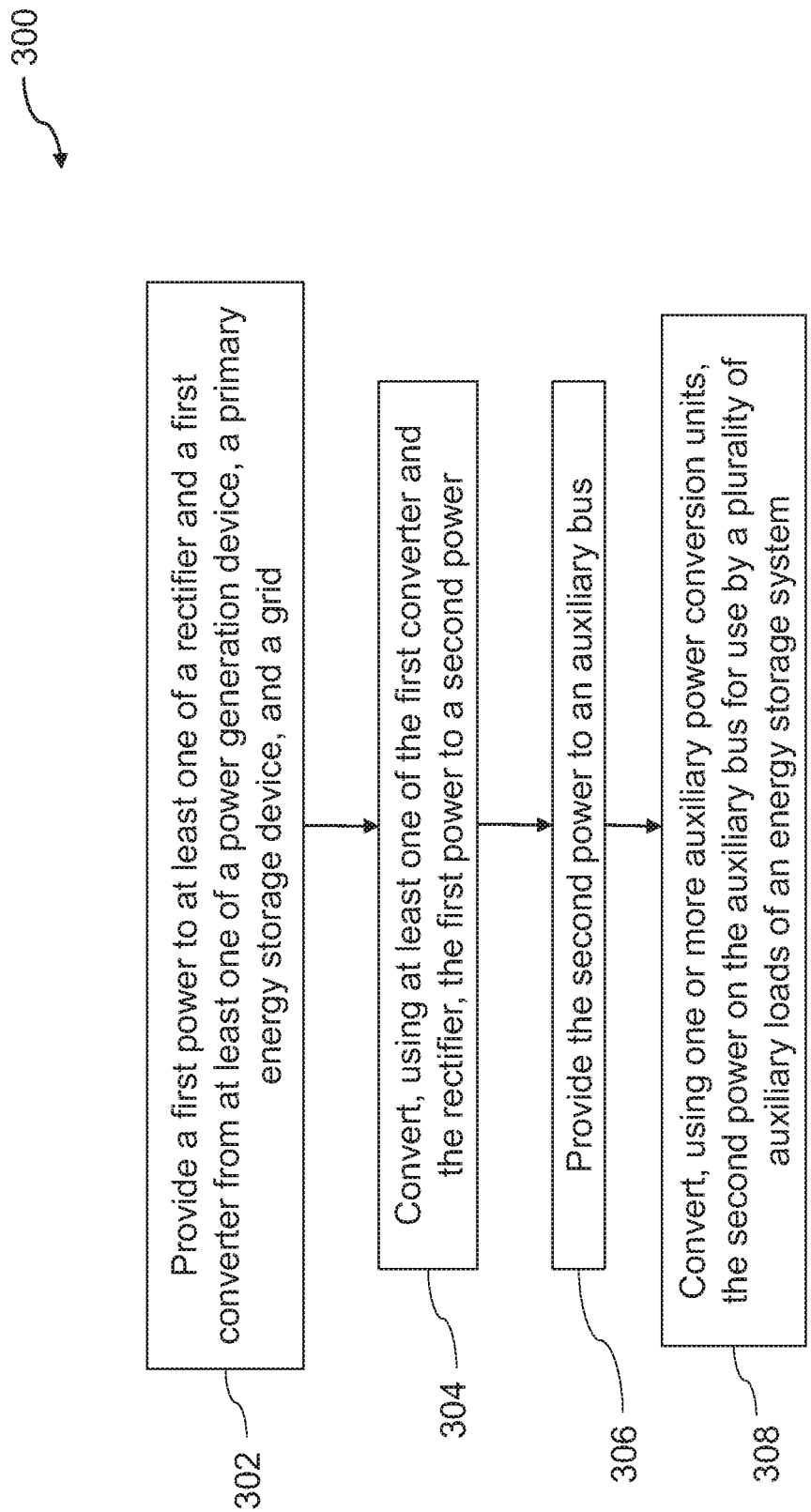
FIG. 3 is a flow chart representing a method of supplying power using the power generation system of FIG. 1, according to aspects of the present specification.

FIG. 3 is a flow chart 300 representing a method of supplying power using the power generation system 101 of FIG. 1. The method of FIG. 3 is described with respect to the components of FIGS. 1 and 2.

The method begins at step 302, where a first power is provided to at least one of the rectifier 232 and the first converter 224 from at least one of the power generation device 202, the primary energy storage device 216, and the grid 206. In one example, a first power is provided to at least one of the first converter 224 and the rectifier 232 from one or more of the primary energy storage device 216, the power generation device 202, the grid 206, or combinations thereof via at least one of the main bus 208 and the grid bus 209. In one scenario, when the power generation device 202 generates excess power, the power generation device 202 provides a portion of the excess power to the primary energy storage device 216 and accordingly, the primary energy storage device 216 is charged. In another scenario, when the power generation device 202 generates excess power, the power generation device 202 provides the first power to the first converter 224. In this example, the first power may be a portion of the excess power. In certain other scenarios, when the power generation device 202 is not generating any excess power, the primary energy storage device 216 is configured to provide the first power to the first converter 224 via the second converter 226 and the main bus 208. In yet another scenario, a combination of the power generation device 202 and the primary energy storage device 216 is configured to provide the first power to the first converter 224. The first power supplied by the primary energy storage device 216 and the power generation device 202 via the first node 228 of the main bus 208 is a DC power. In certain other scenarios where the power generation device 202 is not generating any excess power and the primary energy storage device 216 is in a discharged state, the grid 206 is configured to provide the first power to the rectifier 232 via the grid bus 209. In one example, the first power supplied by the grid 206 to at least one of the rectifier 232 via the second node 230 at the grid bus 209 is an AC power.

At step 304, the first power is converted to a second power using at least one of the first converter 224 and the rectifier 232. As previously noted, the first power is a DC power or an AC power. In one embodiment, the power at the first node 228 is a DC power, while the power at the second node 230 is an AC power. The DC power at the first node 228 is converted by the first converter 224 to a corresponding DC power. In a similar manner, the AC power at the second node 230 is converted by the rectifier 232 to a corresponding DC power. The DC power generated by the first converter 224 and the rectifier 232 may be referred to as a second power. The second power is dependent on the first power. In one embodiment, the second power may be a portion of the first power. Further, at step 306, the second power is provided to the auxiliary bus 210.

Furthermore, at step 308, the second power on the auxiliary bus 210 is converted using the one or more auxiliary power conversion units 220 for use by the plurality of auxiliary loads 222 of the energy storage system 204. Accordingly, in one embodiment, an uninterrupted supply of power is provided to the plurality of auxiliary loads 222 via the auxiliary bus 210. In one example, in addition to the second power, a third power from the back-up energy storage device 218 may be employed to ensure the uninterrupted supply of power to the auxiliary loads 222. In certain scenarios, only the second power is provided to the auxiliary loads 222 via the auxiliary bus 210 to power the auxiliary loads 222. Further, in a scenario where there is no supply of the second power, the third power is provided from the back-up energy storage device 218 to the auxiliary loads 222 via the auxiliary bus 210. In certain other scenarios, a combination of the second power and the third power is provided to the auxiliary loads 222 via the auxiliary bus 210. At any instant in time, either the second power or the third power is provided to the power the auxiliary loads 222. The uninterrupted supply of power provided to the auxiliary loads 222 aids in maintaining the desired operating condition, such as desired temperature in the energy storage system 204.

The reliability of the power generation system 201 is enhanced because of the uninterrupted supply of power to the auxiliary loads 222. Also, use of a dedicated auxiliary bus 210 to provide at least one of the second and third powers to the auxiliary loads 222 enables a simpler circuit architecture.

Various embodiments of a power generation system and a method of supplying power using the power generation system are presented. The systems and methods presented herein aid in providing an uninterrupted supply of power to the auxiliary loads. Accordingly, use of the exemplary power generation system enhances the reliability of the power generation system. Also, use of a dedicated auxiliary bus in the energy storage system to couple the auxiliary loads provides a simpler circuit architecture. The exemplary power generation system may be employed in distributed power generation applications, micro-power generation, small-scale energy generation or larger applications, such as power plants or power stations.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

The invention claimed is:

1. An energy storage system, comprising:
   a primary energy storage device operably couplable to a main bus;
   the main bus is operatively coupled to a power generation device;
   an auxiliary bus operatively couplable to the main bus and a grid bus;
   a plurality of auxiliary loads operatively coupled to the auxiliary bus;
   a housing, at least the primary energy storage device and one or more of the plurality of auxiliary loads located within the housing;
   the auxiliary loads configured to provide thermal support to the primary energy storage device to maintain an operating condition of the energy storage system; and
   the auxiliary bus is configured to supply power to the plurality of auxiliary loads from the primary energy storage device, the power generation device, a grid, or combinations thereof.

2. The energy storage system of claim 1, further comprising a first converter configured to operatively couple one end of the auxiliary bus to the power generation device via the main bus.

3. The energy storage system of claim 1, further comprising a rectifier configured to operatively couple another end of the auxiliary bus to the grid via the grid bus.

4. The energy storage system of claim 1, further comprising a second converter configured to operatively couple the primary energy storage device to the main bus.

5. The energy storage system of claim 1, wherein a voltage of the main bus is higher than a voltage of the auxiliary bus.

6. The energy storage system of claim 1, wherein the plurality of auxiliary loads comprises a cooling blower, a ventilation blower, a battery thermal management device, a battery electrical control device, a control and instrumentation device, or combinations thereof.

7. The energy storage system of claim 1, wherein the plurality of auxiliary loads is operatively coupled to the auxiliary bus via corresponding auxiliary power conversion units.

8. The energy storage system of claim 1, further comprising a back-up energy storage device, wherein the back-up energy storage device is operatively coupled to the auxiliary bus.

9. The energy storage system of claim 1, further comprising a bidirectional converter, wherein the bidirectional converter is operatively coupled to the power generation device via the main bus.

10. A power generation system, comprising:
a power generation device;
a bidirectional converter;
a main bus configured to couple the power generation device to the bidirectional converter;
a primary energy storage device operatively coupled to the main bus, the primary energy storage device located within a housing;
an auxiliary bus operatively coupled to the main bus and a grid bus;
a plurality of auxiliary loads configured to provide thermal support to the primary energy storage device to maintain an operating condition of the energy storage system;
the plurality of auxiliary loads operatively coupled to the auxiliary bus; and
the auxiliary bus is configured to supply power to the plurality of auxiliary loads from the primary energy storage device, the power generation device, a grid, or combinations thereof.

11. The power generation system of claim 10, wherein the power generation device comprises a solar based power generation device, a wind based power generation device, a fuel cell based power generation device, or combinations thereof.

12. The power generation system of claim 10, further comprising a transformer, wherein the transformer is operatively coupled between the bidirectional converter and the grid.

13. The power generation system of claim 10, further comprising a back-up energy storage device, wherein the back-up energy storage device is operatively coupled to the auxiliary bus and configured to provide power to the plurality of auxiliary loads when insufficient power is available from the primary energy storage device, the power generation device, and the grid.

14. The power generation system of claim 13, wherein the primary energy storage device, the power generation device, the grid, the back-up energy storage device, or combinations thereof are configured to facilitate an uninterrupted supply of power to the plurality of auxiliary loads.

15. A method of providing power to a plurality of auxiliary loads of an energy storage system from a power generation device, a primary energy storage device, a grid, or combinations thereof, the method comprising:
providing a first power to at least one of a rectifier and a first converter from at least one of the power generation device, the primary energy storage device, and the grid;
converting, using at least one of the first converter and the rectifier, the first power to a second power;
providing the second power to an auxiliary bus; and
converting, using one or more auxiliary power conversion units, the second power on the auxiliary bus for use by the plurality of auxiliary loads of the energy storage system; and
the auxiliary loads providing thermal support to the primary energy storage device to maintain an operating condition of the energy storage system.

16. The method of claim 15, further comprising providing a third power from a back-up energy storage device to the auxiliary bus via an additional converter coupled directly between the back-up energy storage device and the auxiliary bus.

* * * * *